(12) United States Patent
Chen

(10) Patent No.: US 7,562,976 B2
(45) Date of Patent: Jul. 21, 2009

(54) EYEGLASSES STRUCTURE

(75) Inventor: Mei-Jyu Chen, Tainan Hsien (TW)

(73) Assignee: Hsien Chang Optical Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 11/850,196

(22) Filed: Sep. 5, 2007

(65) Prior Publication Data

US 2009/0059160 A1   Mar. 5, 2009

(51) Int. Cl.
*G02C 5/16* (2006.01)
(52) U.S. Cl. .................. 351/114; 351/119; 351/121
(58) Field of Classification Search .......... 351/111–122
See application file for complete search history.

(56) References Cited

U.S. PATENT DOCUMENTS 7,104,646 B2 * 9/2006 Yang ........................ 351/120

2008/0074608 A1 * 3/2008 Chen ........................ 351/120

* cited by examiner

*Primary Examiner*—Huy K Mai
(74) *Attorney, Agent, or Firm*—Rosenberg, Klein & Lee

(57) ABSTRACT

A pair of eyeglasses includes a frame, lenses embedded in the frame, two coupling pieces pivoted to two ends of the frame respectively, and two temples joined to the coupling pieces respectively; the coupling pieces are flexible and resilient; each of the coupling pieces has a holding hole on a rear end, and a detainment hole on a lateral side thereof, which communicates with the holding hole; each of the temples has a joining section, and an embedded protrusion on a lateral side of the joining section; the temples are each joined to the corresponding coupling piece with the joining section being received in the holding hole, and with the embedded protrusion being embedded in the detainment hole of the coupling piece; in use, the coupling pieces will be made to bend outwardly by the wearer's head, and make the temples pressed against the wearer's head owing to their resilience.

3 Claims, 5 Drawing Sheets

EYEGLASSES STRUCTURE

BACKGROUND OF THE INVENTION

1. Field of the Invention

The present invention relates to a kind of eyeglasses structure, more particularly one, which is equipped with flexible and resilient coupling pieces interposed between the frame and temples thereof such that the eyeglasses will be firm with the temples being pressed against the wearer's head, and the wearer's head can't cause the frame to bend to change the focal distance between the lenses and the wearer's eyes even if the wearer's head is relatively big.

2. Brief Description of the Prior Art

Common eyeglasses include a frame, lenses, and two temples; the frame has receiving holes, and the lenses are held in the receiving holes; the temples are pivoted to two ends of the frame respectively by means of pivotal pieces. In use, the wearer's head will make the temples pivot outwards to a great extent, and cause the frame to bend if the width/size of the wearer's head is greater than the distance between the temples. Consequently, the wearer's head will cause the frame to bend, and in turn the focal distance between the lenses and the wearer's eyes will change, and the eyeglasses can't serve their purpose, i.e. to assist the eyesight/correct visual defects, in a satisfactory manner. Furthermore, the lenses are prone to fall off the frame after the frame is bent.

To overcome the above problem, referring to FIGS. 4 and 5, a certain manufacturer developed an improvement on a pair of eyeglasses, which comprise two spring-loaded pieces 4 intervening between a frame 51 and temples 52 thereof. Each of the temples 52 has a lateral plate-shaped contacting protrusion 521 on a front end thereof, and a holding room 522 on the front end. Each of the spring-loaded pieces 4 includes:

a pivotal element 41, which has a connecting portion 411 at a rear end, a pivotal portion 412 at a front end, and a screw hole 413 on the connecting portion 411; the pivotal element 41 is pivoted to one end of the rim 51 at the front pivotal portion 412;

a fixed sleeve 42, which is positioned around the pivotal element 41, and fixedly detained in the holding room 522 of the corresponding temple 52; the fixed sleeve 42 has a passage 421, and gripping teeth 422 on an outer side to contact an inner side of the holding room 522 of the temple 52;

an elastic element 43, which is received in the holding room 522, and contacts a rear end of the fixed sleeve 42 at a front end thereof; and a bolt 44, which is passed through the elastic element 43, and the passage 421 of the fixed sleeve 42, and joined to the screw hole 413 of the rear connecting portion 411 of the pivotal element 41 so that a rear end of the elastic element 43 contacts a head of the bolt 43; in other words, the elastic element 43 is between the rear end of the fixed sleeve 42 and the head of the bolt 43.

Referring to FIG. 6, in use, the temples 52 together with the spring-loaded pieces 4 will be forced to pivot outwards by the wearer's head if the width of the wearer's head is greater than the distance between the temples 52. At the same time, the spring-loaded pieces 4 will make the temples 52 pressed against the wearer's head in order for the eyeglasses to be firm on the wearer's face. Therefore, the frame 51 of the eyeglasses can't bend, and the focal distance between each of the wearer's eyes and the corresponding lens can't change, and the lenses can't fall off accidentally even if the wearer's head is relatively big.

However, the above structure has the following drawbacks:

1. The manufacturing cost of the eyeglasses is relatively high because the spring-loaded pieces of the eyeglasses comprise many parts.
2. The spring-loaded pieces can get damaged easily, and can cause damage to those parts of the eyeglasses that are adjacent to them because they comprise many parts.
3. The eyeglasses are relatively heavy because the spring-loaded pieces comprise many parts. Consequently, the eyeglasses can be uncomfortable to wear.

SUMMARY OF THE INVENTION

It is a main object of the present invention to provide an improvement on a pair of eyeglasses to overcome the above problems.

A pair of eyeglasses according to an embodiment of the present invention includes a frame, lenses held in the frame, coupling pieces pivoted to two ends of the frame, and two temples joined to the coupling pieces respectively. The coupling pieces are flexible and resilient, and each have a holding hole on a rear end, and a detainment hole on a lateral side thereof, which communicates with the holding hole. Each of the temples has a joining section, and an embedded protrusion on a lateral side of the joining section. The temples are each joined to the corresponding coupling piece with the joining section being received in the holding hole, and the embedded protrusion being embedded in the detainment hole of the coupling piece. In use, the coupling pieces will be made to bend outwardly by the wearer's head, and make the temples pressed against the wearer's head in order for the eyeglasses to be firm owing to their resilience. At the same time, the frame of the eyeglasses can't be caused to bend by the wearer's head even if the wearer's head is relatively large. Consequently, the focal distance between each of the wearer's eyes and the corresponding lens can't be changed, and the eyeglasses can assist the wearer's eyesight in a satisfactory manner.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
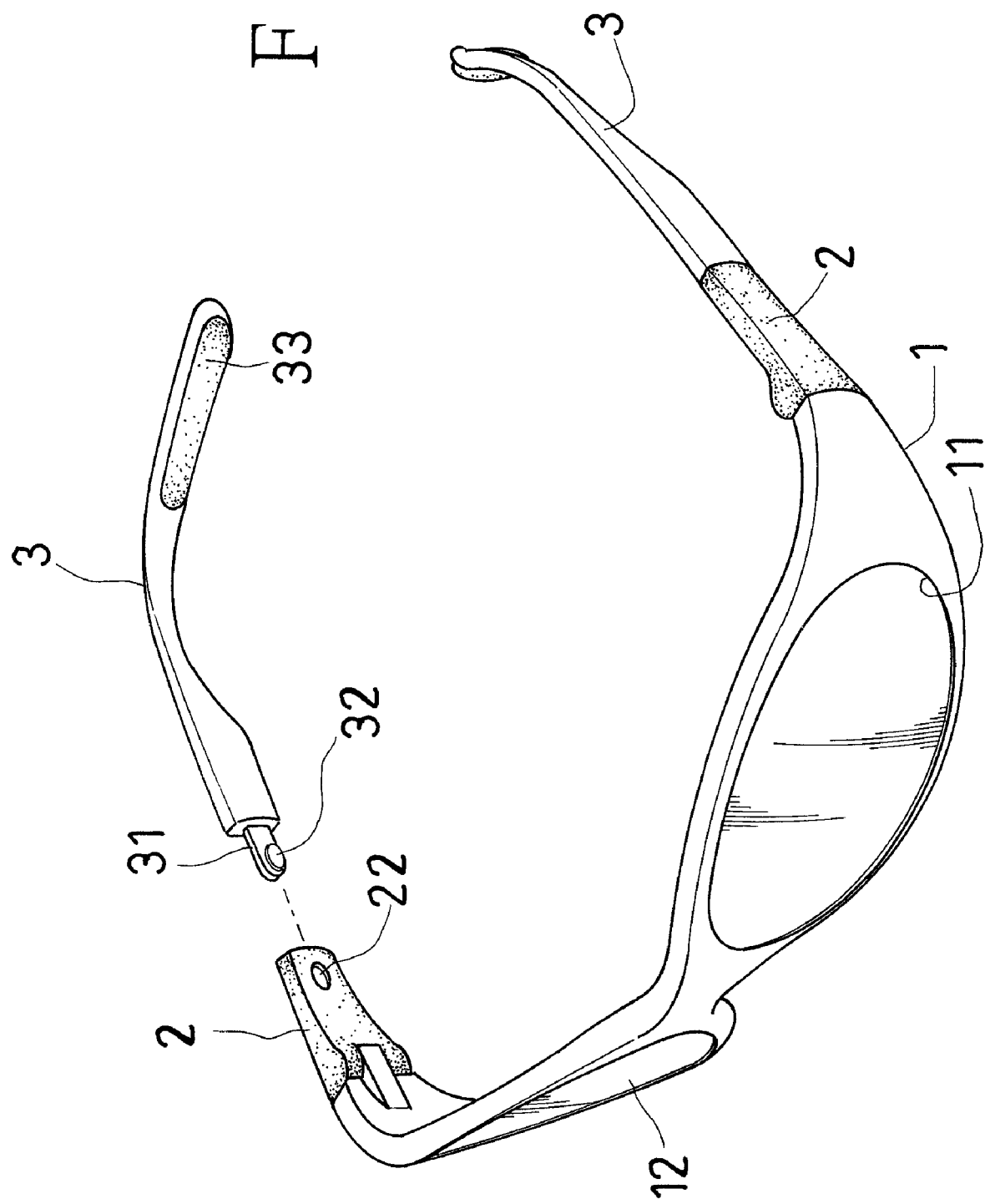
FIG. 1 is an exploded perspective view of the present invention.

Referring to FIG. 1, a preferred embodiment of a kind of eyeglasses structure of the present invention includes:

a frame 1, which has two receiving holes 11 to receive lenses 12;

two coupling pieces 2, the coupling pieces 2 are flexible and resilient, and they can be made of elastic plastic or elastic rubber; each of the coupling pieces 2 is pivoted to one end of the frame 1 at one end thereof; each of the coupling pieces 2 has a holding hole 21 on the other end thereof; each of the coupling pieces 2 has a detainment hole 22 on a lateral side thereof, which is in open communication with the holding hole 21; and two temples 3, which are joined to the two coupling pieces 2 respectively; each of the temples 3 has a joining section 31, and an embedded protrusion 32 on a lateral side of the joining section 31 thereof; the temples 3 are joined to corresponding said coupling pieces 2 with the joining sections 31 being received in thee holding holes 21 of the coupling pieces 2, and with the embedded protrusions 32 being embedded in the detainment holes 22 of the coupling pieces 2.

Furthermore, each of the temples 3 has a slip-prevention pad 33 with a corrugated surface on an inner side of a tail end thereof.

Figure 2:
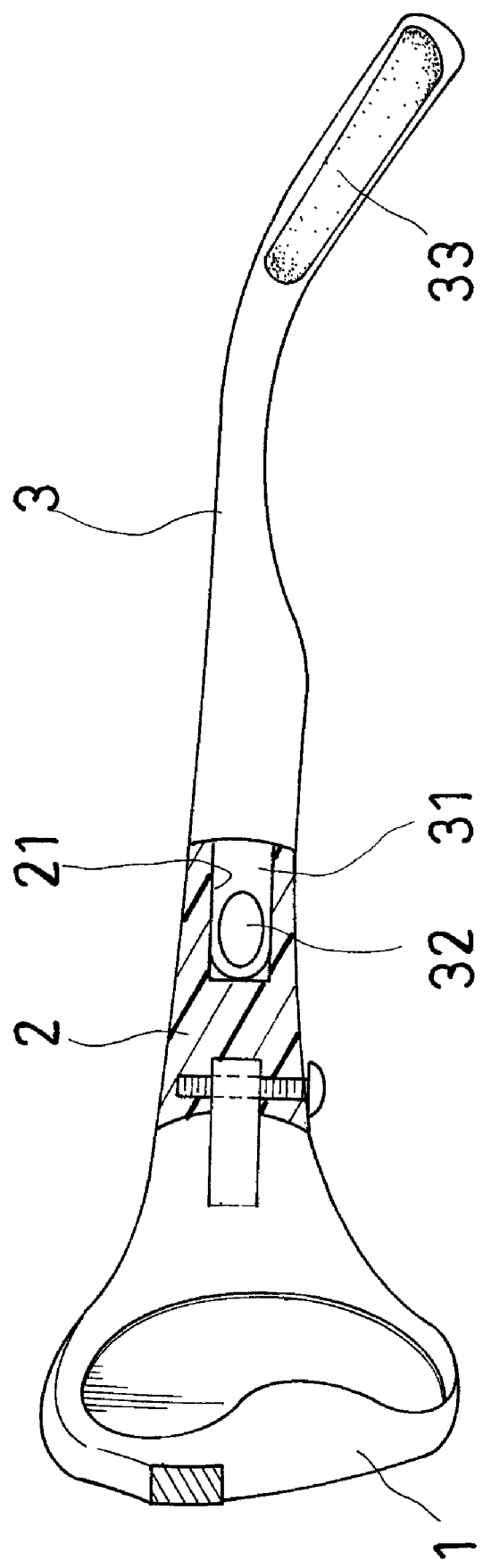
FIG. 2 is a lateral sectional view of the present invention.

In assembly, referring to FIGS. 1 and 2, first the coupling pieces 2 are pivoted to the frame 1, and next the joining sections 31 of the temples 3 are inserted in the holding holes 2 of the coupling pieces 2 respectively with the embedded protrusions 32 being passed into the detainment holes 22 of the coupling pieces 2; thus, the temples 3 are firm on the coupling pieces 2.

Figure 3:
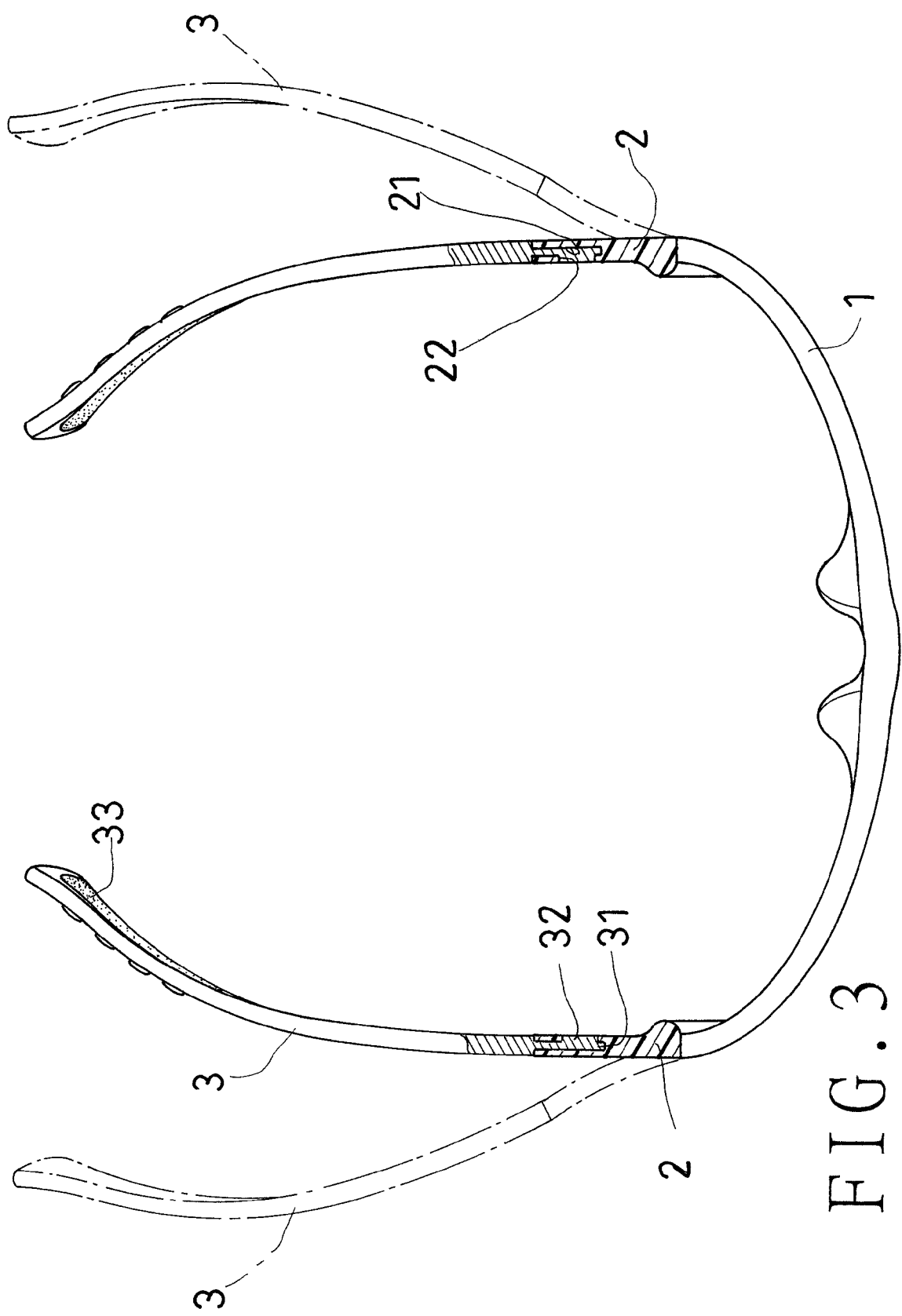
FIG. 3 is a top view of the present invention in use.
Figure 4:
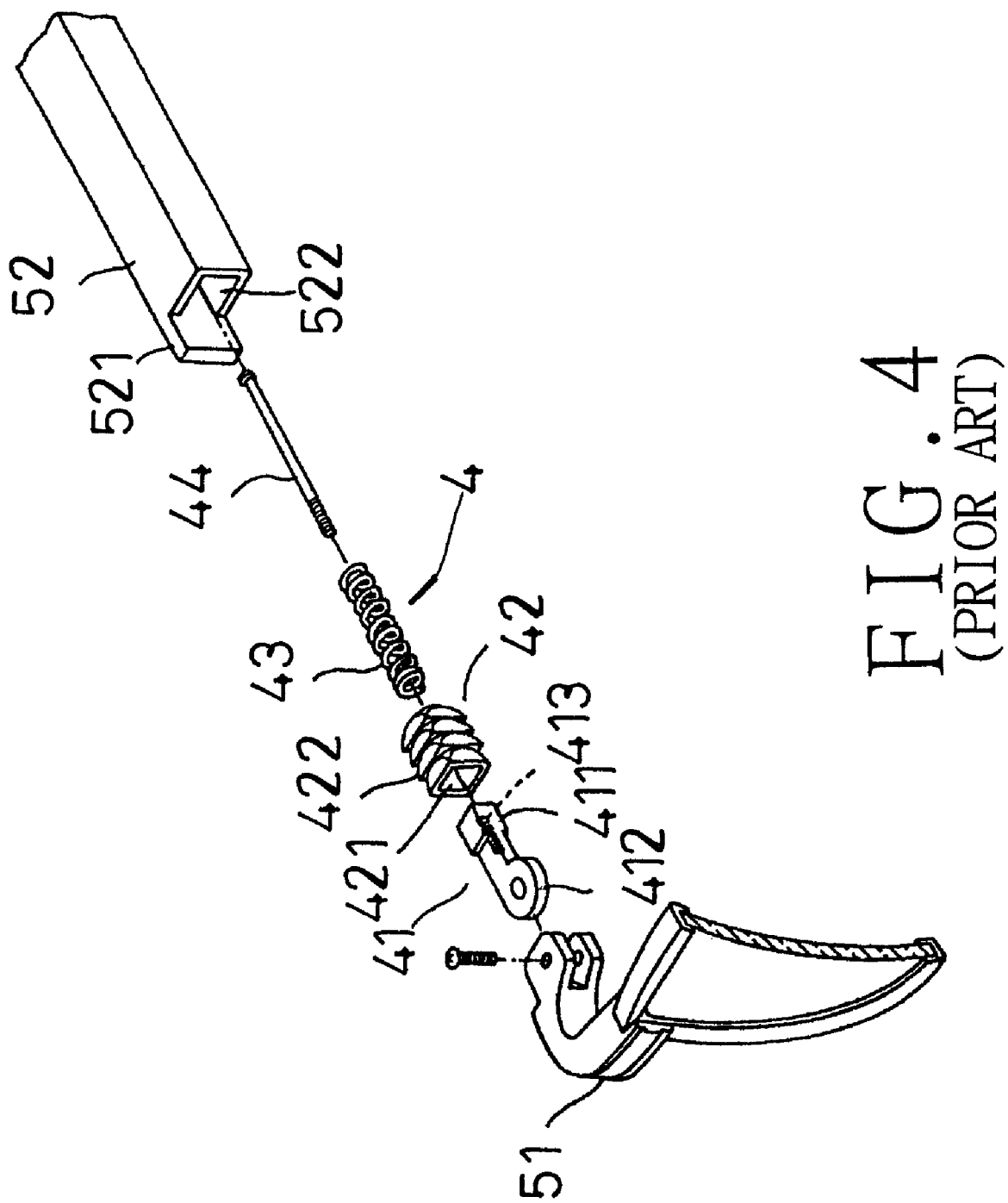
FIG. 4 is an exploded perspective view of the prior art.
Figure 5:
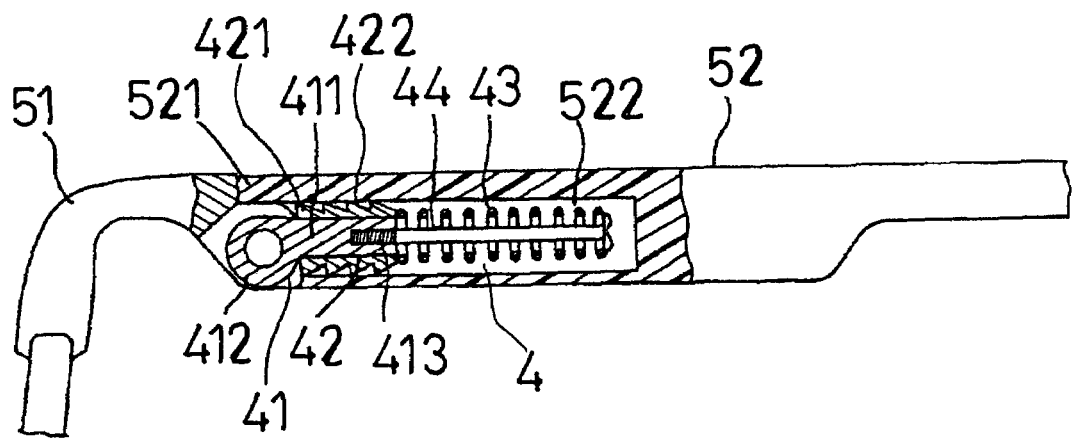
FIG. 5 is a partial sectional view of the prior art.
Figure 6:
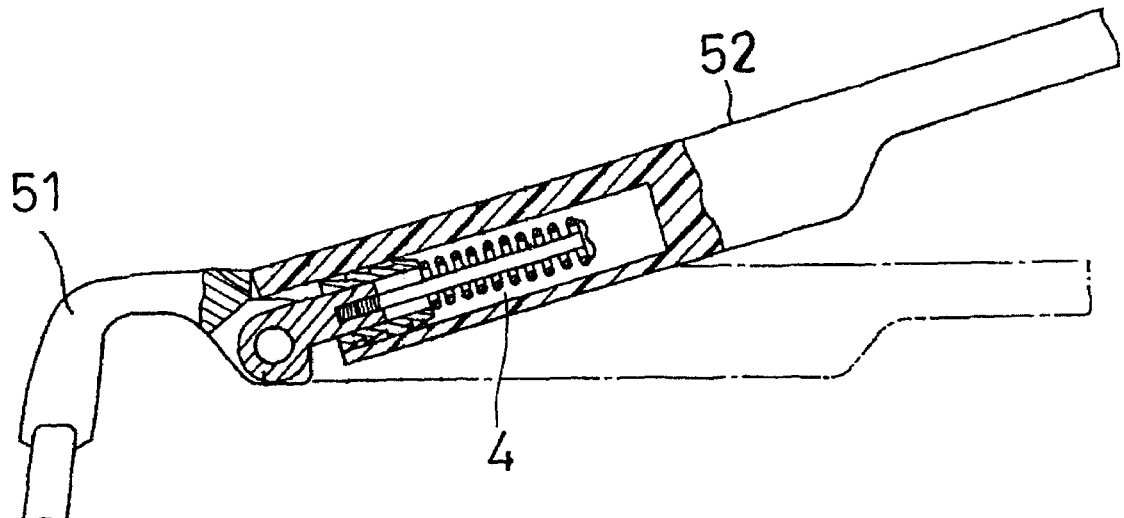
FIG. 6 is a partial sectional view of the prior art in use.

In use, referring to FIG. 3, the flexible coupling pieces 2 will be made to bend outwardly by the wearer's head such that the distance between the rear ends of the temples 3 increases; the extent to which the coupling pieces 2 are bent depends on the width of the wearer's head. And, at the same time, the coupling pieces 2 will make the temples 3 pressed against the wearer's head in order for the eyeglasses to be firm on the wearer's face owing to their resilience. Furthermore, the slip-prevention pads 33 will help to prevent the temples 3 from slipping on the wearer's head accidentally.

The focal distance between each of the wearer's eyes and the corresponding lens can't be changed because the wearer's head can't cause the frame 1 to bend even if it is so big as to cause the flexible coupling pieces 2 to bend. Consequently, the eyeglasses can serve their purpose, i.e. to correct the wearer's visual defects, in a proper manner.

Furthermore, the eyeglasses are less likely to get damaged, relatively inexpensive to manufacture, light in weight, and easy and comfortable to wear because of the resilient coupling pieces 2.

From the above description, it can be seen that the present invention has the following advantages:

1. In use, the coupling pieces will bend outwardly according to the size of the wearer's head, and at the same time the frame of the eyeglasses can't be caused to bend by the wearer's head even if the wearer's head is relatively large. Furthermore, the temples will be pressed against the wearer's head in order for the eyeglasses to be firm on the wearer's face owing to resilience of the coupling pieces. Consequently, the wearer's head can't cause change to the focal distance between each of the wearer's eyes and the corresponding lens, and the eyeglasses can serve their purpose, i.e. to assist the eyesight/correct visual defects, in a satisfactory manner.

2. Owing to the coupling pieces, the eyeglasses of the present invention have a relatively simple structure as compared with the prior art, which is equipped with spring-loaded pieces. Consequently, manufacturing cost can reduce to a great extent according to the present invention.

3. Owing to the simple coupling pieces, the eyeglasses of the present invention have a much lower rate of damage as compared with the prior art equipped with spring-loaded pieces having a complicated structure.

4. Owing to the simple coupling pieces, the eyeglasses of the present invention are lighter in weight and more comfortable to wear than the prior art equipped with spring-loaded pieces, which comprise too many components, and are very heavy.

What is claimed is:

1. An eyeglasses structure, comprising:
   a laterally extended frame, the frame having receiving holes to receive lenses respectively;
   two coupling pieces, the coupling pieces being each pivoted to one end of the frame at one end thereof; the coupling pieces being resiliently deflectable in a lateral direction relative to the frame; the coupling pieces each having a holding hole on other end thereof; the coupling pieces each having a detainment hole on a lateral side communicating with the holding hole thereof; and
   a temple joined to each of the coupling pieces; the temples each having a joining section received in a corresponding said holding hole of the coupling pieces; the temples each having an embedded protrusion on a lateral side of the joining section thereof, which is embedded in a corresponding said detainment hole of the coupling pieces.

2. The eyeglasses structure as claimed in claim 1, wherein the coupling pieces are made of elastic plastic.

3. The eyeglasses structure as claimed in claim 1, wherein the coupling pieces are made of elastic rubber.

* * * * *